Jan. 16, 1940. H. J. HORN ET AL 2,187,032
VEHICLE WHEEL
Filed May 13, 1937 2 Sheets-Sheet 2
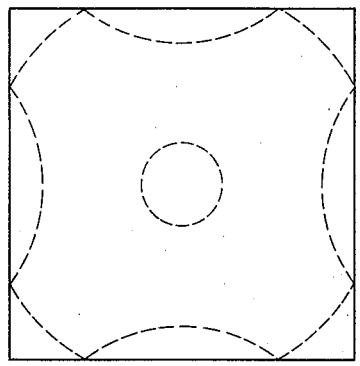
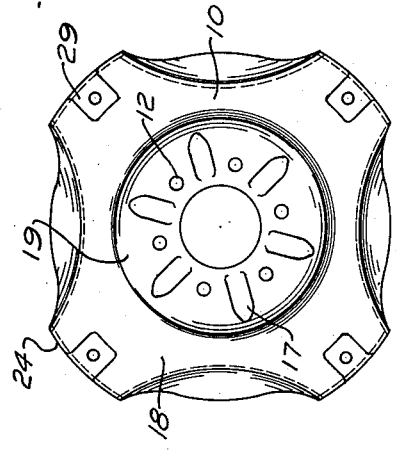
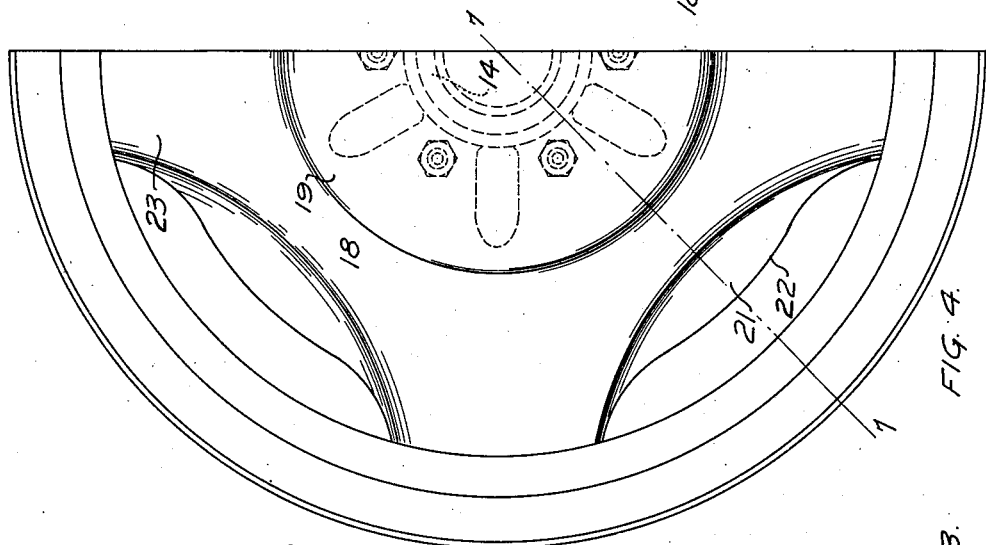
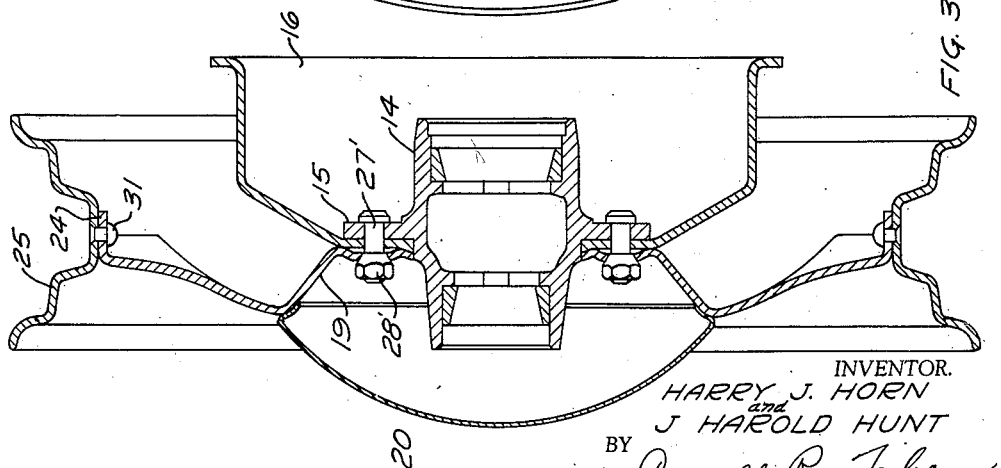
INVENTOR.
HARRY J. HORN
and
J HAROLD HUNT
BY
Carroll R. Taber
ATTORNEY.

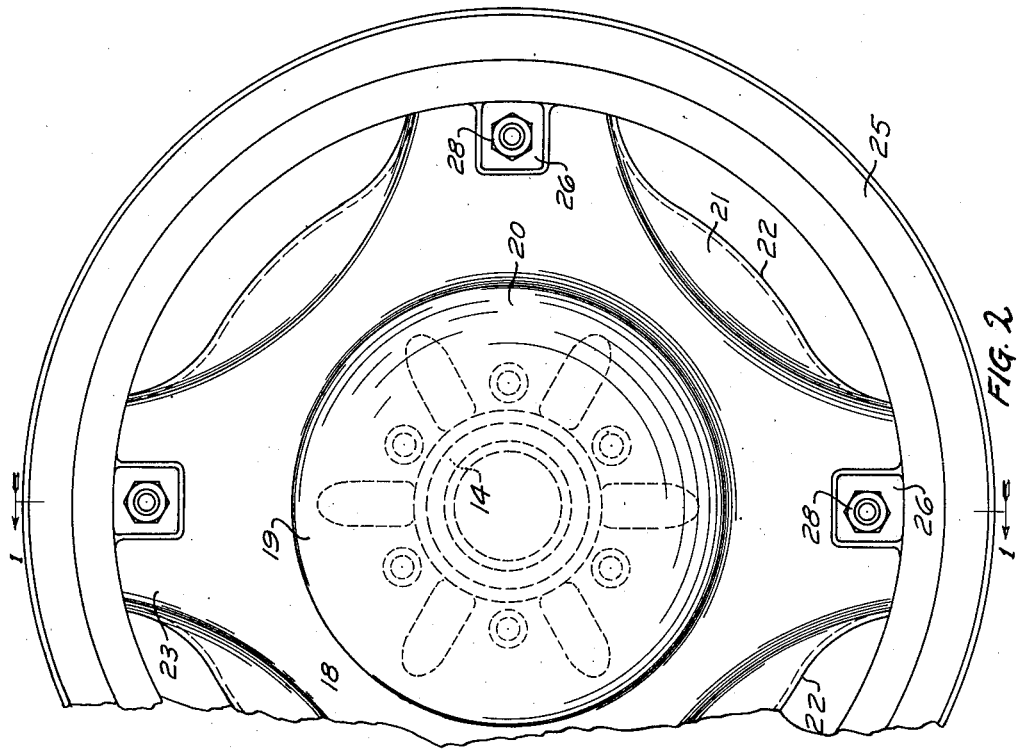
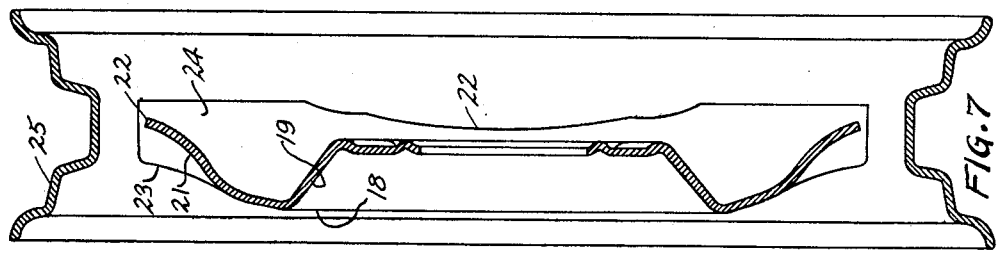
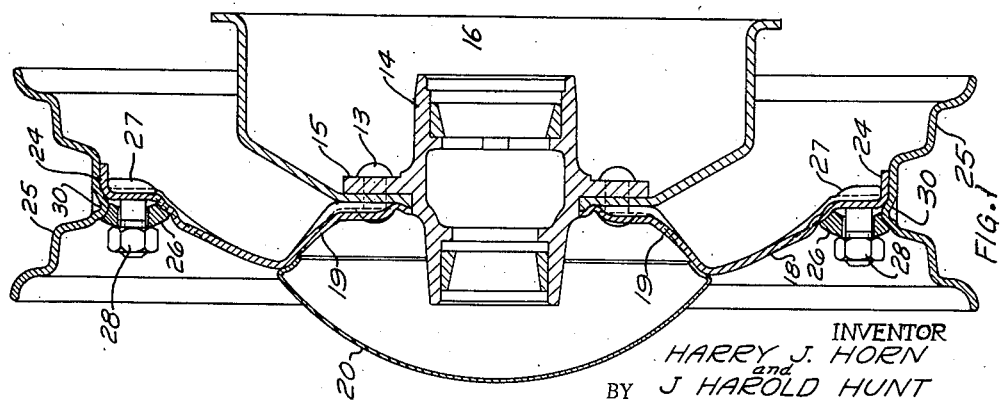

Patented Jan. 16, 1940

2,187,032

UNITED STATES PATENT OFFICE 2,187,032

VEHICLE WHEEL

Harry J. Horn and J. Harold Hunt, Lansing, Mich., assignors to Motor Wheel Corporation, Lansing, Mich., a corporation of Michigan Application May 13, 1937, Serial No. 142,381

2 Claims. (Cl. 301—64)

The present invention relates to metallic wheel constructions and has particular reference to wheel constructions of the type produced from blanks of sheet metal by operations such as pressing, stamping and rolling.

This application is a continuation in part of our co-pending application Serial No. 741,473, filed on August 25, 1934.

An additional object of the invention is the production of a metallic wheel construction of sturdy and attractive structure.

A further object is to produce metallic wheel constructions with a minimum loss of material.

These and other objects will be observed upon a consideration of the following specification and by reference to the accompanying drawings, in which Figure 1 is a sectional view of a metallic wheel constructed in accordance with the present invention taken along the line 1—1 of Figure 2;

Figure 2 is a front view of the wheel shown in Figure 1;

Figure 3 is a sectional view of a modification of the wheel shown in Figures 1 and 2;

Figure 4 is a front view of a portion of the wheel shown in Figure 3;

Figure 5 is a front view of a square blank from which the wheel is produced;

Figure 6 is a front view of a wheel body constructed from the blank shown in Figure 5;

Figure 7 is a sectional view taken on substantially the line 7—7 of Figure 4, the view being a section of a complete wheel.

In the manufacture of wheels for automobiles, trucks and the like, it is common to produce a wheel of the so-called disk type by suitably stamping or rolling a sheet metal blank into the desired disk formation. Disk wheels generally are produced in substantially true circular form, portions of the wheel structure being turned over to form rim-supporting elements. It has been recognized as advantageous to produce metallic wheel structures which depart from the disk type by being provided with spoke-like formations formed from the sheet metal out of which the wheel is constructed. In addition to the more attractive appearance of the spoke type metallic wheel, the spoke formations have the advantage of strengthening the wheel structure and lessening the chance of the wheel buckling or being otherwise distorted out of its natural shape. To produce conventional spoke-type metallic wheels substantially circular blanks are provided with a central hub opening and are pressed or stamped in a well known manner into the desired shape.

As sheet metal is produced in the form of substantially rectangular sheets of considerably greater size than required to produce a single wheel, it is necessary to strike from a large sheet of the raw material a number of substantially circular blanks, and naturally a considerable quantity of sheet metal is lost as waste. This loss of material increases the cost of the finished wheel.

In accordance with the present invention, the metallic spoke wheel constructions are produced from square blanks of proper size, so that there is practically no loss of material, since a large rectangular blank of sheet metal may be cut into squares of the size suited for the production of such wheels. Thereby, we are able to produce a maximum number of wheels from a given quantity of sheet material.

In the drawings, Figure 5 represents a square blank of sheet metal material properly proportioned to produce a single wheel, the principal lines along which the blank is to be bent or stamped being indicated in dotted lines. The blank is passed through suitable stamping or pressing operations which result in a wheel construction as shown in Figure 6. This wheel is shown in mounted position in Figures 1 and 2, in which the wheel body 10 is provided with a central hub-receiving opening 11 surrounded by a plurality of openings 12 through which extend rivets 13. Rivets 13 form an interlock between the wheel structure and a central hub member 14 of conventional design.

Between the flange 15 of the hub member and the wheel structure is locked the back of a brake drum 16. In order to further strengthen the inner portion of the wheel construction about the hub-receiving opening 11 a series of flanges 17 are provided between the adjacent openings 12, as is shown in Figures 2 and 6.

In the stamping operation by which the wheel is produced the substantally square blank is pressed forwardly progressively from its outer portions and toward the central hub-receiving opening in substantially convex shape with the inner or central portions of the blank progressively further disposed from the original plane of the blank, as will be seen in Figures 1 and 3, thereby forming the annular wall 18 and the front walls of the spokes of the wheel. Adjacent the hub opening 11 the wheel structure is indented to form a backwardly extending annular wall 19 joining the wall 18 to the central wheel attaching portion of the wheel which lies in substantially the original plane of the blank. It will be understood that the wall 19 ordinarily is produced at the same time as the wall 18 by holding the central and outer portion of the blank and pressing the walls 18 and 19 into the described shape in a suitable die. About the junction of the walls 18 and 19 may be positioned a conventional hub cap 20.

Between adjacent corner portions of the square blank from which the wheel is produced are provided indentations 21 which preferably are of substantially circular shape. That is, the indentations are progressively deeper toward their central portions, as will be seen in Figures 2 and 6. Since the wall 18 extends progressively further away from the original plane of the blank toward the central portion of the wheel, sufficient material is provided for the indented portions 21 to extend substantially back to the original plane of the wheel. The outer edges 22 of the indented portions between the corners of the blank may be rounded so as to give the appearance of being a part of the same circle, as shown in Figure 2.

The indentations 21 form spoke-like structures 23 at each of the four corners of the blank and provide side walls for the four spokes which extend substantially back to the original plane of the blank and lend strength, as well as the appearance of body, to the spoke structures. The corners of the blank are turned over to form rim-supporting members 24 upon which is demountably positioned a suitable rim or felloe 25. If desired, the rim may be permanently mounted to the wheel body. Lugs 26 lock the rim to the wheel by means of bolts 27 and nuts 28.

Spoke wheels constructed as described have been found particularly advantageous from many standpoints. The wheels are sturdy due to the bracing effect of the combined spoke and indented portions, and the structure is particularly attractive. In some cases it may be found desirable to trim away a portion of the material between the corners of the blank before or after the formation of the indented portions of the finished wheel construction. Also it is preferred that the turned over corner portions of the blank be trimmed to provide proper rim seats. In this way an even lighter wheel is produced without substantial sacrifice of strength. The indented portions form a strong bracing structure for the intermediate spoke portions, the central indentation of the wheel about the hub opening also assisting in this particular.

To provide an effective interlock of the rim to the wheel construction the spoke portions are indented to provide bolt recesses 29. The outer edge of the indented portion 29 may be turned over to form a portion of the rim-supporting element 24. A particularly effective interlock is obtained by providing the rim 25 with indented portions 30 which fit into the bolt receiving indentations 29 of the spoke portions, the lugs 26 fitting against indentations 30 and against the base of the indentations 29.

In manufacture, the square blank from which the wheel is produced may be provided with a central hub-receiving opening 11 and openings 12 and then subjected to a stamping operation to form the remainder of the elements of the wheel in one operation.

The use of square blanks permits the construction of spoke wheels in an economical manner from the standpoint of material used and it has been found that the preparation and distribution of material in a square blank are such as to provide a particularly strong wheel which may be pressed with ease into the shape necessary to provide this strength. By the provision of the annular indented portion 19, the annular portion 18 and the curved edges 22, a square blank is made to have the appearance of a circular disk with four spokes connected thereto.

Reference herein and in the appended claims to "pressing" is intended to include all the various known methods which may be employed for forming the sheet metal into the desired shape, such as stamping and rolling.

Figures 3 and 4 show a slight modification of the device shown in the other figures, differing primarily in having the wheel body riveted securely to the rim and being attached to the hub by bolt 27' and nut 28'.

Various modifications of the structure which has been described heretofore for purposes of illustration and explanation may be made without departing from the scope of the invention, and all such changes are intended to be included in the appended claims.

We claim:

1. In a wheel, the combination with a rim of a wheel body constituting the sole support therefor, comprising a substantially square blank of metal having spoke formations at the four corners thereof connected to each other by intervening web portions, the spoke and web portions merging into a central convex annulus defining a hub cap opening, the center of the blank constituting a radially extending bolting on flange located radially and axially inwardly of said central annulus, each of said web portions being shaped to form a sweeping curved surface from one spoke end to the adjacent spoke end, said curved surface having a radius which is of substantially the same length as the radius of the wheel body as a whole and a center of curvature located outside of the wheel.

2. In a wheel, the combination with a rim of a wheel body constituting the sole support therefor, comprising a substantially square blank of metal having spoke formations at the four corners thereof connected to each other by intervening web portions, the spoke and web portions merging into a central convex annulus defining a hub cap opening, the center of the blank constituting a radially extending bolting on flange located radially and axially inwardly of said central annulus, each of said web portions being shaped to form a sweeping curved surface from one spoke end to the adjacent spoke end, said curved surface having a radius which is of substantially the same length as the radius of the wheel body as a whole and a center of curvature located outside of the wheel, the peripheries of said web portions being arranged to form circumferentially spaced apart arcs of a circle concentric with the rim.

HARRY J. HORN.
J. HAROLD HUNT.